Figure 1:
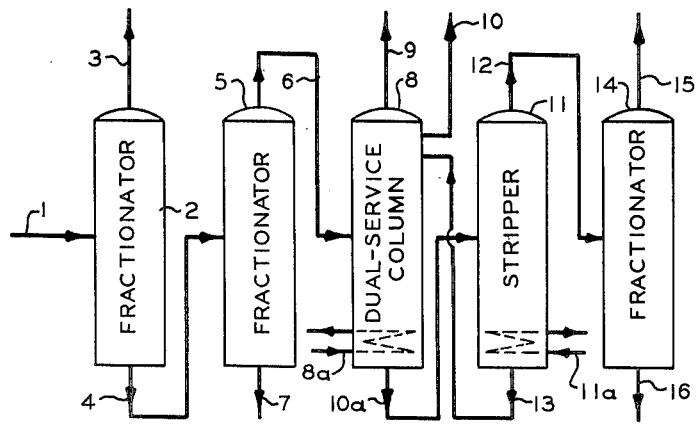

Feb. 15, 1966

H. A. CLAY 3,235,471

PURIFICATION OF $C_4$-$C_6$ 1-OLEFINS BY
EXTRACTIVE DISTILLATION
Filed March 16, 1962

INVENTOR.
H. A. CLAY

BY *Young & Quigg*

ATTORNEYS

United States Patent Office 3,235,471
Patented Feb. 15, 1966

3,235,471
PURIFICATION OF C₄-C₆ 1-OLEFINS BY
EXTRACTIVE DISTILLATION
Harris A. Clay, Bartlesville, Okla., assignor to Phillips
Petroleum Company, a corporation of Delaware
Filed Mar. 16, 1962, Ser. No. 180,100
8 Claims. (Cl. 203—54)

This invention relates to a method for recovery of butene-1, substantially free from other $C_4$ hydrocarbons, from gaseous mixtures containing the same. In one aspect it relates to an improvement in the operation of the extractive distillation zone employed in the process for the separation of butadiene from admixture with butanes, butenes and acetylenes.

In recent years the production of butadiene by the cracking or dehydrogenation of selected hydrocarbons has become increasingly important because of its use in the manufacture of synthetic rubber by solution, as well as emulsion polymerization processes. The butene-1 which results from the dehydrogenation of butane, along with butadiene, substituted acetylenes, and butenes-2, after appropriate physical separation, has generally been passed to a second dehydrogenation step for further dehydrogenation into butadiene. One of the more successful processes for the purification of butadiene is disclosed in U.S. Patent 2,415,006 to K. H. Hachmuth.

There is a considerable and growing demand for 1-olefins, including butene-1, for the manufacture of solid olefin polymers and solid olefin copolymers. Thus, it is now advantageous to recover butene-1 from the products of the first and second stages of the dehydrogenation of butane, free from impurities, such as substituted acetylenes, and substantially free from other $C_4$ hydrocarbons. It can then provide a ready source of monomer for the dynamic solid polyolefin industry. However, in the prior art process of purifying butadiene, the regular butene-1 concentrate stream contains more substituted acetylenes and other $C_4$ hydrocarbons than can be tolerated in applications such as polymerization of butene-1 to form solid polymer. The solution of this impurity problem, insofar as the concentrations of methyl, vinyl and ethyl acetylenes are concerned, has been disclosed in my issued U.S. Patent 3,013,952. Nevertheless, this still leaves to be reckoned with the relatively high level of mixed $C_4$ hydrocarbon impurities, mostly normal butane and butenes-2, in the overhead product of the extractive distillation column. In the prior art, this would necessitate the overhead stream being processed in a separate fractional distillation column to yield the purer butene-1 product desired for polymerization.

I have discovered that the concentration of $C_4$ hydrocarbons in the overhead product of the extractive distillation column, other than the desired butene-1, can be substantially reduced by supplying the lean solvent, returned from the rich solvent stripping zone which follows the extractive distillation step, to about the middle tray of the distillation column, and further providing a side draw outlet intermediate the lean solvent entry point and the top of said zone, and preferably nearer the former, for the purpose of drawing off $C_4$ hydrocarbons, principally normal butane and butenes-2, separated from said butene-1, by conventional fractionation in the upper portion of said distillation column. Thus, the column performs as a dual-service fractionating column, in the lower portion of which is carried on the conventional extractive distillation of butadiene, substituted acetylenes, and some butenes-2 by well-stripped lean solvent, while the upper section performs a fractional distillation function of separating butene-1 from normal butane and butenes-2.

It is, therefore, a principal object of this invention to provide a method for recovery of butene-1 substantially free from admixture with other $C_4$ hydrocarbons, normally resulting from the dehydrogenation of normal butane and normal butenes.

It is another object of the invention to provide a butene-1 stream substantially free from $C_4$ hydrocarbons as well as substituted acetylenes in a process for recovering butadiene from products of butane and butene dehydrogenation.

It is still another object of the invention to provide an improved method of operating the extractive distillation zone in the process for the separation of butadiene from the products of butane and butene dehydrogenation.

Other objects, modifications, and alterations of this invention will become apparent to those skilled in the art without departing from the scope and spirit of this invention and it should be understood that the latter is not necessarily limited to the aforementioned discussion.

Figure 2:
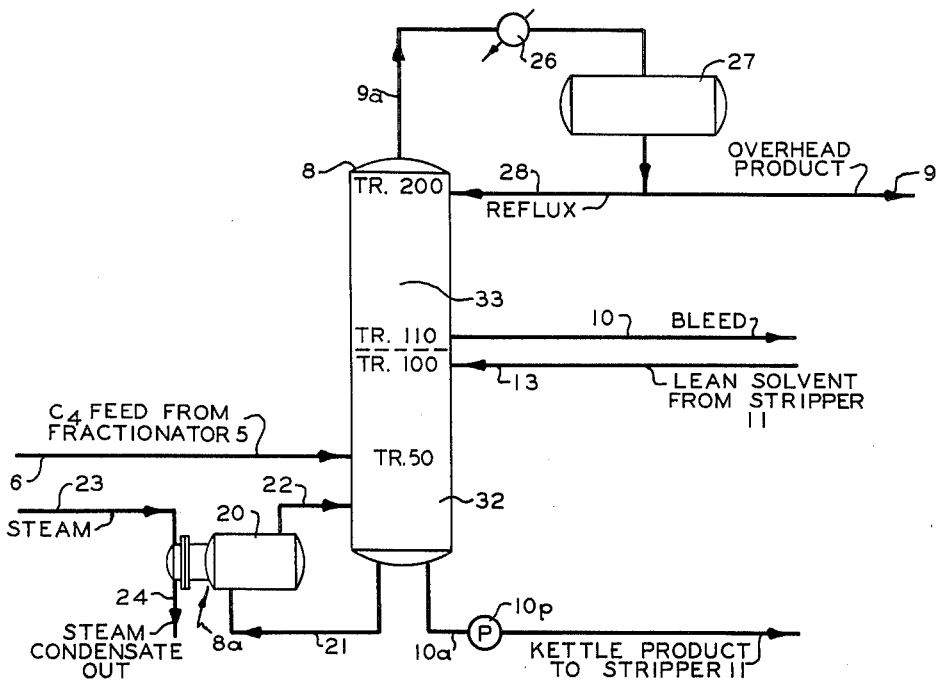

FIGURE 1 is a schematic illustration of a butadiene purification system wherein the invention is practiced; and FIGURE 2 is an enlarged view of a portion of FIGURE 1 showing a preferred embodiment of the invention.

Referring now to the drawing, and to FIGURE 1 in particular, a butadiene-containing feed derived from the catalytic dehydrogenation of $C_4$ paraffins and/or olefins is passed via conduit 1 to depropanizer 2, from whence $C_3$ and lighter hydrocarbons are removed overhead via conduit 3. $C_4$ and heavier hydrocarbons are removed as kettle product via conduit 4, and are passed to fractionator 5 from which $C_5$ and heavier hydrocarbons, including some butenes-2, are removed via conduit 7 as kettle product. The $C_4$ fraction removed from fractionator 5 as overhead product comprises principally butadiene, butene-1, normal butane, vinyl and ethyl acetylenes, and some of both trans and cis butene-2, and is passed via conduit 6 to dual service column 8, from whence the overhead product comprising butene-1, but substantially no other $C_4$ hydrocarbons, as well as no substituted acetylenes, when operated according to the invention, is removed from column 8 via conduit 9. A stream containing normal butane and butenes-2 is removed from the dual-service column 8 via conduit 10. An extractive distillation is conducted in the lower portion of column 8 in the presence of a selective solvent, which is introduced to column 8 via conduit 13. A preferred solvent is a furfural-water mixture. Other suitable solvents for these purposes are glycols such as ethylene glycol, glycol ethers, ketones, such as acetone, and nitriles such as acetonitrile. These solvents may be water diluted also. Heat is supplied to column 8 by means of heat exchanger 8a, which can be a steam heated reboiler, or any other desired type of heat exchanger. The rich solvent resulting from the extractive distillation in column 8 and comprising solvent, butadiene, butenes-2, and substituted actylenes, is removed from column 8 via conduit 10a and is passed to stripper 11 wherein heat is added by means of heat exchanger 11a. The hydrocarbons dissolved in the solvent are removed as overhead product via conduit 12 and passed to fractionator 14, from whence substantially pure butadiene is removed overhead via conduit 15, and butenes-2 and substituted acetylenes are removed as kettle product via conduit 16. Lean furfural, substantially completely free of substituted acetylenes, is removed from the bottom of stripper 11, and after its water and heavier hydrocarbon oils concentrations are adjusted as desired (not shown), passed via conduit 13 into the central section of column 8 as the solvent for the extractive distillation carried out therein.

Referring now to FIGURE 2, the invention will be described in more detail as applied to the operation of dual-service column 8 of FIGURE 1. The overhead product from fractionator 5, containing the $C_4$ fraction and substituted actylenes, passes to dual-purpose column 8 via conduit 6, as heretofore shown in FIGURE 1, entering about tray 50 (numbering upwardly from the reboiler) in a 200 tray column. Heat is supplied to column 8 by means of the heat exchanger indicated at 8a. The heat exchanger, indicated as 8a in FIGURE 1, is shown as an external reboiler 20 in FIGURE 2. It receives liquid from column 8 via conduit 21, and returns heated liquid and vapor to column 8 via conduit 22. Reboiler 20 receives heat by condensation of steam fed by conduit 23 into a conventional tube bundle, condensate being removed by line 24. Rich solvent is removed from column 8 and is passed via conduit 10a and pump 10p to stripper 11. The overhead vapor stream from column 8 passes via conduit 9a and condenser 26 to hydrocarbon condensate accumulator 27. A portion of this condensate is returned to column 8 as reflux via conduit 28. The remainder is withdrawn from the system as product butene-1, substantially free of other $C_4$ hydrocarbons, which passes via conduit 9 to further use, a polymerization process, for example.

The relatively pure butene-1 in stream 9 is achieved by the particular manner of introduction of lean solvent returning from stripper 11, and the withdrawal of normal butane containing stream via conduit 10. The well-stripped furfural is returned via conduit 13 to about tray 100 of 200 tray column 8. Side draw outlet conduit 10 is disposed intermediate the lean solvent entry point and the top of the column. In the case of furfural and $C_4$ hydrocarbons separation, for example, it is preferably located about tray 110, in order to preclude any vaporized selective solvent from being lost from the absorption cycle. Generally, the position of side draw conduit 10 relative to the lean solvent entry point is dependent upon the relative volatility of the solvent to the hydrocarbons being processed. This outlet permits withdrawal of $C_4$ hydrocarbons, principally normal butane and trans- and vis-butenes-2, from the upper portion of column 8. Thus, the column operates as a dual-service fractionating column. In the lower section 32, conventional extractive distillation of butadiene, substituted acetylenes, and some butenes-2, by well stripped lean furfural is carried on. In the upper section 33, a straight (highly refluxed) fractional distillation operation of separating butene-1 from other $C_4$ hydrocarbons, principally normal butane, is made possible, with the attendant savings in the omission of a separate fractionation column, reboiler and other auxiliaries for separating butene-1 from other $C_4$'s, as required in the prior art practices.

EXAMPLE

Following is an example of my invention. The flowing stream quantities are not to be deemed unduly limitative of the scope of our invention. Reference is made to FIGURE 2, showing the operation of the dual-service column 8 for the separation of a substantially pure butene-1 stream from a mixed $C_4$ feed stream, starting with feed conduit 6.

Table I

[Pounds mols per hour]

| Component | Mixed $C_4$ Feed, Stream 6 | Rich Solvent, Stream 10a | Lean Solvent, Stream 13 | Butene-1, Stream 9 | Normal $C_4$ and Butenes-2, Stream 10 |
|---|---|---|---|---|---|
| Butene-1 | 870.0 | 3.8 | | 750.0 | 116.2 |
| Butadiene | 433.0 | 416.2 | 0.2 | 8.2 | 8.8 |
| Normal Butane | 151.0 | 0.1 | | 16.0 | 134.9 |
| Other $C_4$ Hydrocarbons | 252.0 | 83.1 | | 10.0 | 158.9 |
| Furfural | | 12,481.6 | 12,481.6 | | |
| Water | | 2,774.0 | 2,774.8 | 0.8 | |

The effect of column operating conditions and of heat input and removal via the process streams, upon the compositions of the product streams is known in the prior art, so that a compatible set of operating parameters may be determined by conventional chemical engineering calculation techniques.

The novel separation method herein disclosed may be applied to other groups of difficultly separable organic compounds, in particular, such frequently occurring petroleum refinery and chemical plant mixtures of diolefinic, acetylenic, olefinic and paraffinic hydrocarbons possessing the same number of carbon atoms as the $C_5$, $C_6$, and other fractions. The relative volatilities of the various components of $C_5$ hydrocarbon fractions resulting from cracking or dehydrogenation (either thermal or catalytic) of such charge stocks as gas oils, residuum, mixed pentanes, isoamylene concentrate, etc., are known, as evidenced by U.S. Patent 2,361,493 to John A. Patterson. From these considerations, it may be seen that in the separation of a mixed $C_5$ diolefinic-olefinic-paraffinic (2- and 3-methyl-1-butenes plus 1-pentene) through overhead product conduit 9; the recovery of normal pentane and the 2-olefins (trans- and cis 2-pentene plus 2 methyl-2-butene) is made through side draw conduit 10; and the recovery of isoprene, other diolefins and acetylenes is made through kettle product conduit 10a.

Many different separations of the above mentioned compounds may be performed, depending upon the number of trays in each of the several sections of the tower, the ratio of selective solvent to feed, the amount of heat energy expended per unit of feed in each of several locations, the feed composition, and other considerations. Other more specific $C_5$ separations that can be accomplished include: (a) α olefins from n-pentane, 2-pentanes, and 2-methyl-2-pentene; (b) 3-methyl-1-butene from isopentane; (d) pentene-1 from n-pentane, and (e) 3-methyl-1-butene and 2-methyl-1-butene from n-pentane. The following $C_5$ separation, Table II, listed under (a) above, is intended to further illustrate a typical separation, but is not to be construed as a limitation thereof.

Table II

[Pounds moles per hour]

| Component | Dual Service Column Feed (6) | Dual Service Column Kettle Product (10a) | Dual Service Column Overhead Product (9) | Dual Service Column Side Draw (10) | Solvent Stripper Overhead Product (12) |
|---|---|---|---|---|---|
| 3-Methyl-1-butene | +1.9 | | 1.7 | 0.2 | |
| Isopentane | 2.4 | | 2.1 | 0.3 | |
| 1-Pentene | 26.5 | 0.2 | 22.5 | 3.8 | 0.2 |
| 2-Methyl-1-butene | 6.6 | trace | 5.5 | 1.1 | trace |
| Isoprene | 28.3 | 28.1 | | 0.2 | 28.1 |
| n-Pentane | 3.9 | | 0.4 | 3.5 | |
| trans-2-Pentene | 7.6 | 3.8 | 0.4 | 3.4 | 3.8 |
| cis-2-Pentene | 4.9 | 2.5 | 0.3 | 2.1 | 2.5 |
| 2-Methyl-2-butene | 13.7 | 8.0 | 0.6 | 5.1 | 8.0 |
| Other $C_5$'s | 4.2 | 4.2 | | | 4.2 |
| Solvent | | 1,872.0 | | | |

Table III presents a material balance showing the application of the separation method of this invention to a dehydrogenated isoamylene fraction for the concentration of the isoprene contained therein, the latter hydrocarbon being withdrawn as kettle product.

Table III

[Pounds moles per hour]

| Component | Dual Service Column Feed (6) | Dual Service Column Kettle Product (10a) | Dual Service Column Overhead Product (9) | Dual Service Column Side Draw (10) | Solvent Stripper Overhead Product (12) |
|---|---|---|---|---|---|
| 3-Methyl-1-butene | 5.2 | | 4.5 | 0.7 | |
| Isopentane | 5.6 | | 0.1 | 5.5 | |
| 2-Methyl-1-butene | 28.0 | 0.1 | 0.4 | 27.5 | 0.1 |
| Isoprene | 25.0 | 24.9 | | 0.1 | 24.9 |
| 2-Methyl-2-butene | 32.3 | 29.3 | | 3.0 | 29.3 |
| Other $C_5$'s | 3.9 | 3.9 | | | 3.9 |
| Solvent | | 2,328.0 | | | |

I claim:

1. A process for recovering butadiene and butene-1 from an effluent stream from a catalytic dehydrogenation zone for $C_4$ hydrocarbons comprising: passing the effluent stream to a first distillation zone; withdrawing $C_3$ and lighter hydrocarbons from the upper portion of said first distillation zone; removing the heavier hydrocarbons from the lower portion of said first distillation zone to a second distillation zone; withdrawing $C_5$ and heavier hydrocarbons from the lower portion of said second distillation zone; removing the $C_4$ hydrocarbon fraction from the upper end of said second distillation zone to an extractive distillation zone; absorbing butadiene, butenes-2, and substituted acetylenes with a selective solvent in the lower portion of said extractive distillation zone without substantial absorption of normal butane and butene-1; passing solvent rich in said $C_5$ and heavier hydrocarbons to a stripping zone for removal of absorbed hydrocarbons, returning the resulting lean solvent from the bottom portion of said stripping zone to a first point of said extractive distillation zone; withdrawing a side stream from a second point intermediate the first point and the top of said extractive distillation zone, said side stream comprising normal butane separated from said butene-1 by conventional fractionation in the upper portion of said extractive distillation zone; withdrawing butene-1 product as the overhead of said extractive distillation zone substantially free of normal butane; removing the separated hydrocarbons from the upper portion of said stripping zone to a third distillation zone; withdrawing butenes-2 and substituted acetylenes from the bottom portion of said third distillation zone; and removing substantially pure butadiene from the upper portion of said last-mentioned zone as a product of said process.

2. In recovering butene-1 from a mixture of hydrocarbons including normal butane, butenes, butadiene, and substituted acetylenes, the method of substantially eliminating normal butane from the butene-1 product, comprising: absorbing butadiene, butenes-2 and substituted acetylene with a selective solvent in the lower portion of an extractive distillation zone without substantial absorption of normal butane and butene-1; removing rich solvent as bottoms product from said extractive distillation zone to a stripping zone for removal of absorbed hydrocarbons, returning the stripped solvent from the bottom portion of said stripping zone to about the middle of said extractive distillation zone; withdrawing a side stream from a point intermediate the lean solvent entry point and the top of said extractive distillation zone, said side stream comprising normal butane separated from said butene-1 by conventional fractionation in the upper portion of said extractive distillation zone; and withdrawing butene-1 as the overhead product of said extractive distillation zone substantially free of normal butane.

3. The method of claim 2 wherein said lean solvent entry point is located about the middle tray of a tray-type distillation zone.

4. The method of claim 2 wherein said side stream withdrawal is located substantially closer to said lean solvent entry point than to the top of said extractive distillation zone.

5. A process for recovering volatile 1-olefins from a mixture of hydrocarbons having 4–6 carbon atoms per molecule including normal paraffins, dienes, olefins and substituted acetylenes comprising: absorbing dienes, olefins-2, and substituted acetylenes with a selective solvent in the lower portion of an extractive distillation zone without substantial absorption of 1-olefins and normal paraffins; passing the rich solvent from the lower portion of said extractive distillation zone to a stripping zone for removal of absorbed hydrocarbons; returning the resulting lean solvent from the bottom portion of said stripping zone to about the middle of said extractive distillation zone; withdrawing a side stream from a point intermediate the lean solvent entry point in the top of said extractive distillation zone, said side stream comprising normal paraffins separated from said 1-olefins by conventional fractionation in the upper portion of said extractive distillation zone; and withdrawing 1-olefins as the overhead product of said extractive distillation zone substantially free of normal paraffins.

6. The process according to claim 5 in which said overhead product comprises butene-1, said side stream comprises normal butane, and said absorbed hydrocarbons comprise butadiene, butenes-2, and substituted acetylenes.

7. The process according to claim 5 in which said overhead product comprises $C_5$ α-olefins, said side stream comprises normal $C_5$ olefins and said absorbed hydrocarbons comprise $C_5$ diolefins, 2-pentenes, and 2-methyl-2-butene.

8. The process according to claim 5 in which said overhead product comprises 3-methyl-1-butene, said side stream comprises 2-methyl-2-butene, and said absorbed hydrocarbons comprise isoprene.

References Cited by the Examiner

UNITED STATES PATENTS

| | | | |
|---|---|---|---|
| 2,361,493 | 10/1944 | Patterson | 202—39.5 |
| 2,395,016 | 2/1946 | Schulze et al. | |
| 2,415,006 | 1/1947 | Hachmuth | 202—39.5 X |
| 2,612,467 | 9/1952 | Morrell et al. | 202—39.5 |
| 2,878,167 | 3/1959 | Alheritiere et al. | 202—39.5 X |
| 2,961,383 | 11/1960 | Black | 202—39.5 |
| 2,982,795 | 5/1961 | Owen | 260—681.5 |
| 3,013,952 | 12/1961 | Clay | 202—39.5 |

NORMAN YUDKOFF, *Primary Examiner.*

GEORGE D. MITCHELL, *Examiner.*